US009789648B2

(12) United States Patent
Lee et al.

(10) Patent No.: US 9,789,648 B2
(45) Date of Patent: Oct. 17, 2017

(54) METHOD OF USING HIGH PUSH FORCE TO FABRICATE COMPOSITE MATERIAL CONTAINING CARBON MATERIAL

(71) Applicant: Taiwan Carbon Nanotube Technology Corporation, Miaoli County (TW)

(72) Inventors: Ting-Chuan Lee, Miaoli County (TW); Chun-Hsien Tsai, Miaoli County (TW); Chun-Jung Tsai, Miaoli County (TW); Ching-Tung Hsu, Miaoli County (TW); Chia-Hung Li, Miaoli County (TW); Wen-Hui Liu, Miaoli County (TW); Jui-Yu Jao, Miaoli County (TW)

(73) Assignee: TAIWAN CARBON NANO TECHNOLOGY CORPORATION, Zhunan Township, Miaoli County (TW)

( * ) Notice: Subject to any disclaimer, the term of this patent is extended or adjusted under 35 U.S.C. 154(b) by 118 days.

(21) Appl. No.: 14/708,919

(22) Filed: May 11, 2015

(65) Prior Publication Data

US 2016/0236235 A1   Aug. 18, 2016

(30) Foreign Application Priority Data

Feb. 12, 2015  (TW) .............................. 104104688 A

(51) Int. Cl.
*B29C 67/00*  (2017.01)
*C09K 3/00*  (2006.01)
*B29K 105/16*  (2006.01)
*B29K 507/04*  (2006.01)

(52) U.S. Cl.
CPC ............ *B29C 67/0033* (2013.01); *C09K 3/00* (2013.01); *B29K 2105/162* (2013.01); *B29K 2507/04* (2013.01)

(58) Field of Classification Search
CPC ................................... B05D 1/18; B05D 7/02
See application file for complete search history.

(56) References Cited

U.S. PATENT DOCUMENTS

| | | | | |
|---|---|---|---|---|
| 6,447,555 B1 * | 9/2002 | Okamura | ............... | H01G 9/155 29/25.03 |
| 2010/0252184 A1 * | 10/2010 | Morimoto | .............. | B82Y 30/00 156/241 |
| 2013/0155578 A1 * | 6/2013 | Tsai | ....................... | H01G 11/24 361/502 |

FOREIGN PATENT DOCUMENTS

TW        I448424 B      8/2014

OTHER PUBLICATIONS

Lee, T.S., English Abstract KR2011008518A, 2011.*

* cited by examiner

*Primary Examiner* — David Turocy
(74) *Attorney, Agent, or Firm* — Muncy, Geissler, Olds & Lowe, P.C.

(57) ABSTRACT

A method of using high push force to fabricate a composite material containing carbon material comprises steps placing a substrate in a carbon material-containing dispersion including a carbon material, and letting one surface of the substrate contact the carbon material-containing dispersion; and providing a high push force range between 300 G and 3000 G to the carbon material-containing dispersion to push the carbon material-containing dispersion and make the carbon material enter the substrate to form a composite material containing the carbon material.

10 Claims, 6 Drawing Sheets

METHOD OF USING HIGH PUSH FORCE TO FABRICATE COMPOSITE MATERIAL CONTAINING CARBON MATERIAL

FIELD OF THE INVENTION

The present invention relates to a method of fabricating a composite material containing carbon material, particularly to a method of using a high push force to fabricate a composite material containing carbon material.

BACKGROUND OF THE INVENTION

Carbon nanotubes have special structure and many superior chemical and physical properties, such as high thermal conductivity, high electric conductivity, high strength and lightweightness. Therefore, application of carbon nanotubes is developing prosperously, especially the composite material integrating a substrate with carbon nanotubes to add superior properties of carbon nanotubes to the substrate. For example, the composite materials integrating metallic materials, plastic materials, semiconductor elements or fabric fiber with carbon nanotubes have been extensively studies and widely used. Therefore, the composite materials containing carbon nanotubes are growing more and more important.

A Taiwan patent No. I448424 disclosed a method for fabricating a carbon nanotube composite material, which comprises steps: dissolving polyvinylidene fluoride (PVDF) in a first solvent to form a PVDF solution; providing a powder of carbon nanotubes, and dispersing the carbon nanotube powder in the PVDF solution to form a first suspensoid; moving the first suspensoid to a second solvent to segregate PVDF from the first solvent and let a portion of PVDF combine with the surface of carbon nanotubes so as to form a second suspensoid; filtering the second suspensoid to obtain an intermediate product; baking the intermediate product to form a carbon nanotube composite.

In fabricating a carbon nanotube composite, it is critical for the properties and quality of the carbon nanotube composite material to uniformly distribute carbon nanotubes in the substrate. In the conventional technologies of fabricating carbon nanotube composite materials, the mixing methods can be categorized into a wet type (e.g. the one used by the prior art described above) and a dry type. The wet type mixing method uses a liquid as the medium and uses mechanical force to mix carbon nanotubes with a substrate or another material. The dry type mixing method directly mixes carbon nanotubes with a substrate or another material in a dry state. However, there is always possibility of uneven mixing no matter what type of mixing method is used.

SUMMARY OF THE INVENTION

One objective of the present invention is to solve the problem that the conventional methods of fabricating composite material containing carbon material cannot uniformly disperse carbon nanotubes in a composite material.

In order to achieve the abovementioned objective, the present invention proposes a method of using high push force to fabricate a composite material containing carbon material, which comprises steps: preparing a carbon material-containing dispersion including a carbon material; placing a substrate in the dispersion, and letting one surface of the substrate contact the carbon material-containing dispersion; and providing a high push force range between 300 G and 3000 G to the carbon material-containing dispersion to drive the carbon material to enter the substrate to form a composite material containing carbon material.

Via the high push force, the carbon material in the carbon material-containing dispersion is driven into the substrate to form a composite material containing carbon material with the carbon material uniformly distributed in the substrate.

DETAILED DESCRIPTION OF THE PREFERRED EMBODIMENTS

The technical contents of the present invention will be described in detail in cooperation with drawings below.

Figure 1B:
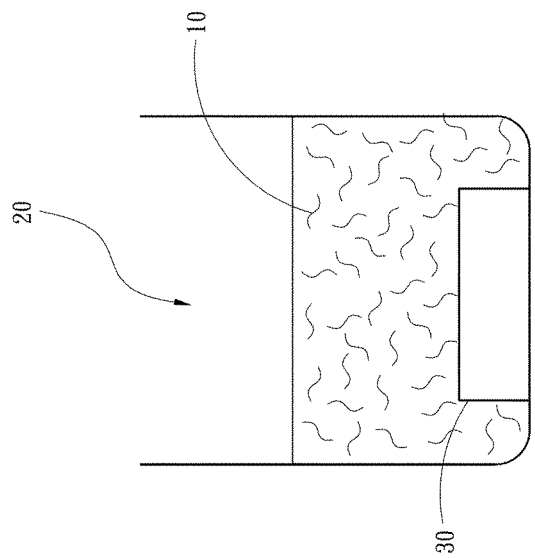
FIG. 1B is a diagram schematically showing another step of the method according to one embodiment of the present invention.
Figure 1A:
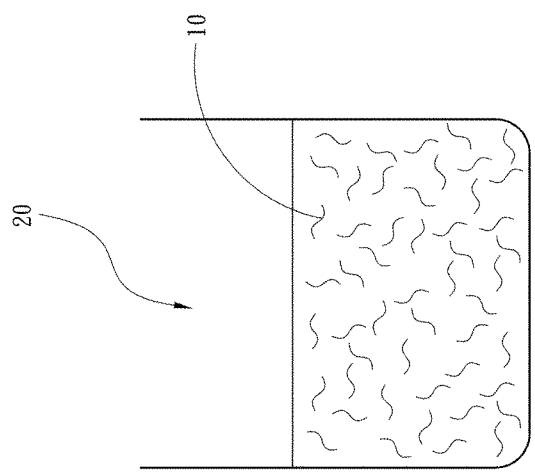
FIG. 1A is a diagram schematically showing a step of the method according to one embodiment of the present invention.
Figure 1C:
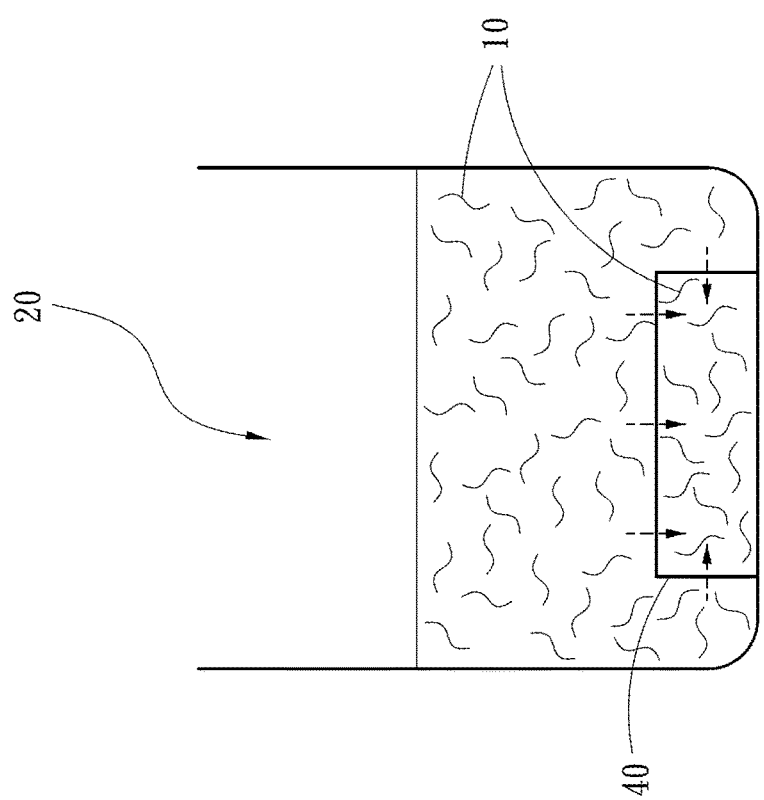
FIG. 1C is a diagram schematically showing a further step of the method according to one embodiment of the present invention.

The present invention discloses a method of using high push force to fabricate a composite material containing carbon material. Refer to FIG. 1A, FIG. 1B and FIG. 1C diagrams schematically showing the steps of the method according to one embodiment of the present invention. As shown in FIG. 1A, prepare a carbon material-containing dispersion 20 including a carbon material 10. The carbon material 10 is selected from a group consisting of carbon nanotubes, graphene, fullerene, and nanoribbons. As shown in FIG. 1B, place a substrate 30 in the carbon material-containing dispersion 20, and let one surface of the substrate 30 contact the carbon material-containing dispersion 20. The substrate 30 is made of a metallic material, a polymeric material or a ceramic material. The metallic material is selected from a group consisting of aluminum, copper, titanium, tin, zinc and lead. The polymeric material is selected from a group consisting of polyethylene (PE), polystyrene (PS), polypropylene (PP), polycarbonate (PC), nylon, epoxy, silicone, and solvent-free plastic materials. Then, as shown in FIG. 1C, provide a high push force to the carbon material-containing dispersion 20 to push the carbon material-containing dispersion 20 and make the carbon material 10 enter the substrate 30 to form a composite material 40 containing the carbon material 10.

In one embodiment, the carbon material 10 is in form of a dispersion. In some embodiments, the substrate 30 is in form of a powder, grains, a colloid, or a bulk material. After the composite material 40 is acquired, the method of the present invention may further use a forming step to fabricate the composite material 40 into a shaped body according to requirement. Dependent on the types and combination of the materials, the forming step may be a step of sintering, hot isostatic pressing, thermosetting, injection molding, melting, casting, spraying, or screen printing. The shaped body may be but is not limited to be a bulk body, a thin film or a thick film. For an example, the carbon material-containing dispersion 20 is a carbon nanotube dispersion; the substrate 30 is a bulk material made of one of the abovementioned metallic materials; the composite material 40 is melted to obtain the shaped body. For another example, the carbon material-containing dispersion 20 is a graphene dispersion; the substrate 30 is grains made of one of the abovementioned polymeric materials; the composite material 40 is injection-molded to obtain the shaped body.

In the present invention, the high push force has a range between 300 G and 3000 G, wherein G is gravitational constant (also known as the universal gravitational constant or Newton's constant). And the high push force is generated by a reaction or provided by a machine. The reaction may be a chemical reaction or an explosive reaction. For example, the reaction is an explosive reaction generated by igniting a combustible material to create a chemical reaction; the chemical reaction generates high energy; the high energy generates a high push force expanding the carbon material-containing dispersion 20 outward from the center of the chemical reaction and pushing the carbon material 10 to enter the substrate 30.

Figure 2A:
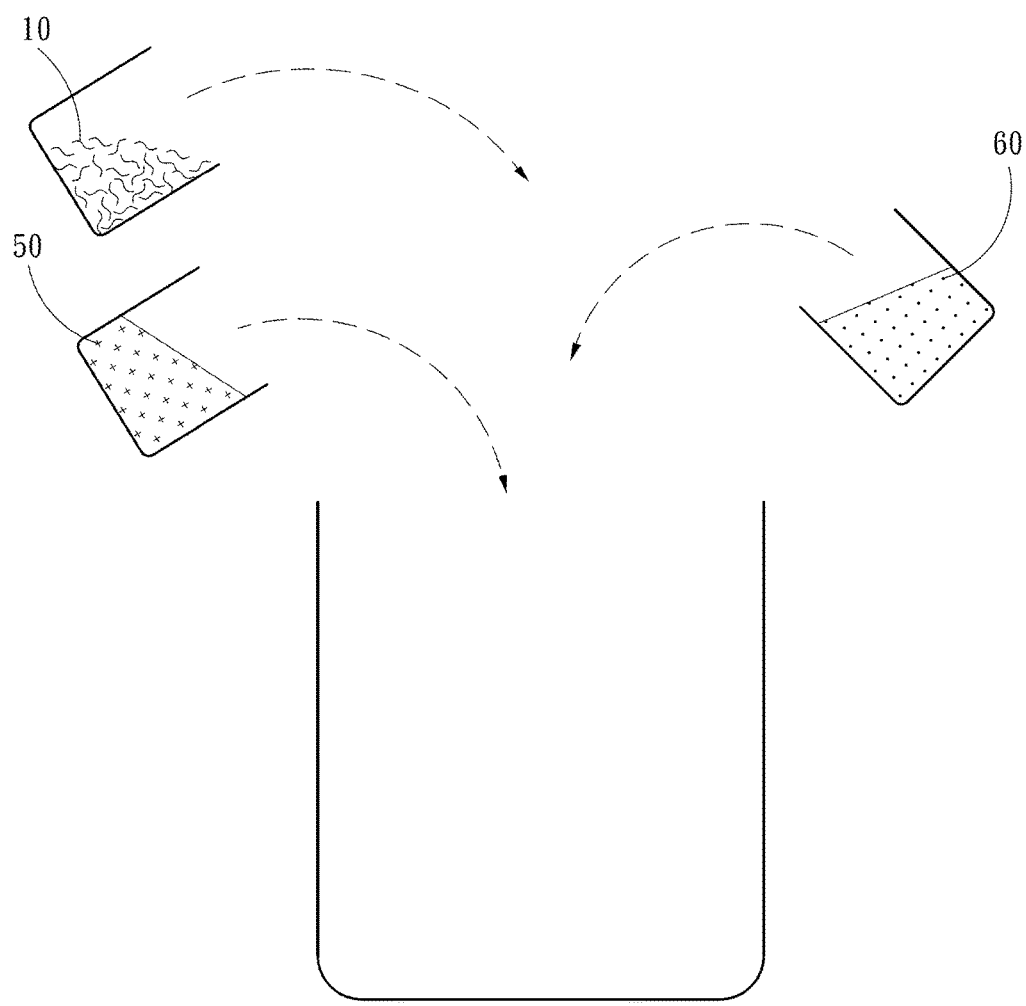
FIG. 2A is a first diagram schematically showing a method of fabricating a carbon material-containing dispersion according to one embodiment of the present invention.
Figure 2B:
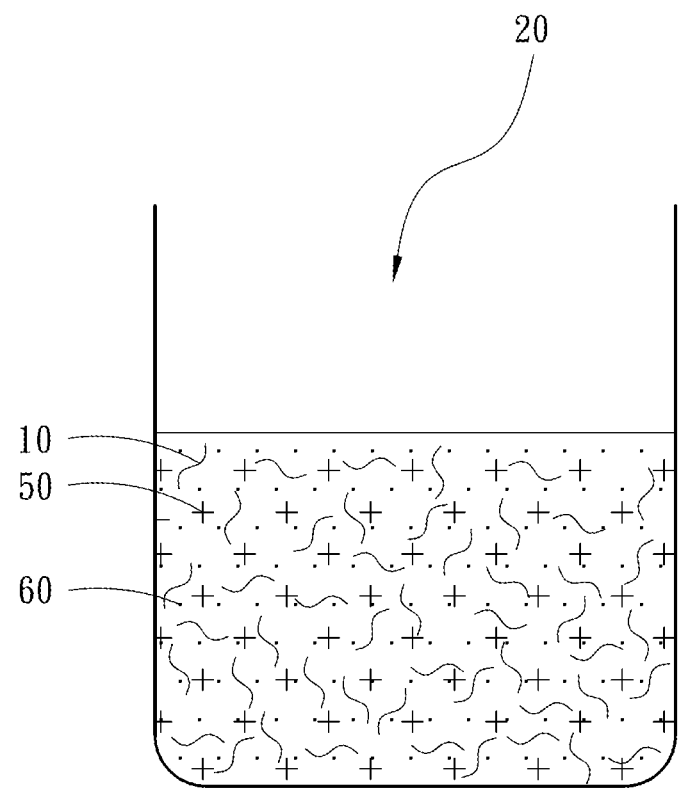
FIG. 2B is a second diagram schematically showing a method of fabricating a carbon material-containing dispersion according to one embodiment of the present invention.

Refer to FIG. 2A and FIG. 2B diagrams schematically showing a method of fabricating a carbon material-containing dispersion according to one embodiment of the present invention. In this embodiment, the carbon material-containing dispersion 20 is fabricated via mixing the carbon material 10, a surfactant 50 and an aqueous solvent 60. The surfactant 50 makes the carbon material 10 solve in the aqueous solvent 60 more easily. The surfactant 50 is ammonium carboxymethyl cellulose or sodium carboxymethyl cellulose. The weight percentage of the carbon material 10 in the carbon material-containing dispersion 20 is 0.1 wt %-10 wt % preferably. The weight percentage of the surfactant 50 in the carbon material-containing dispersion 20 is 0.01 wt %-10 wt % preferably.

Figure 3A:
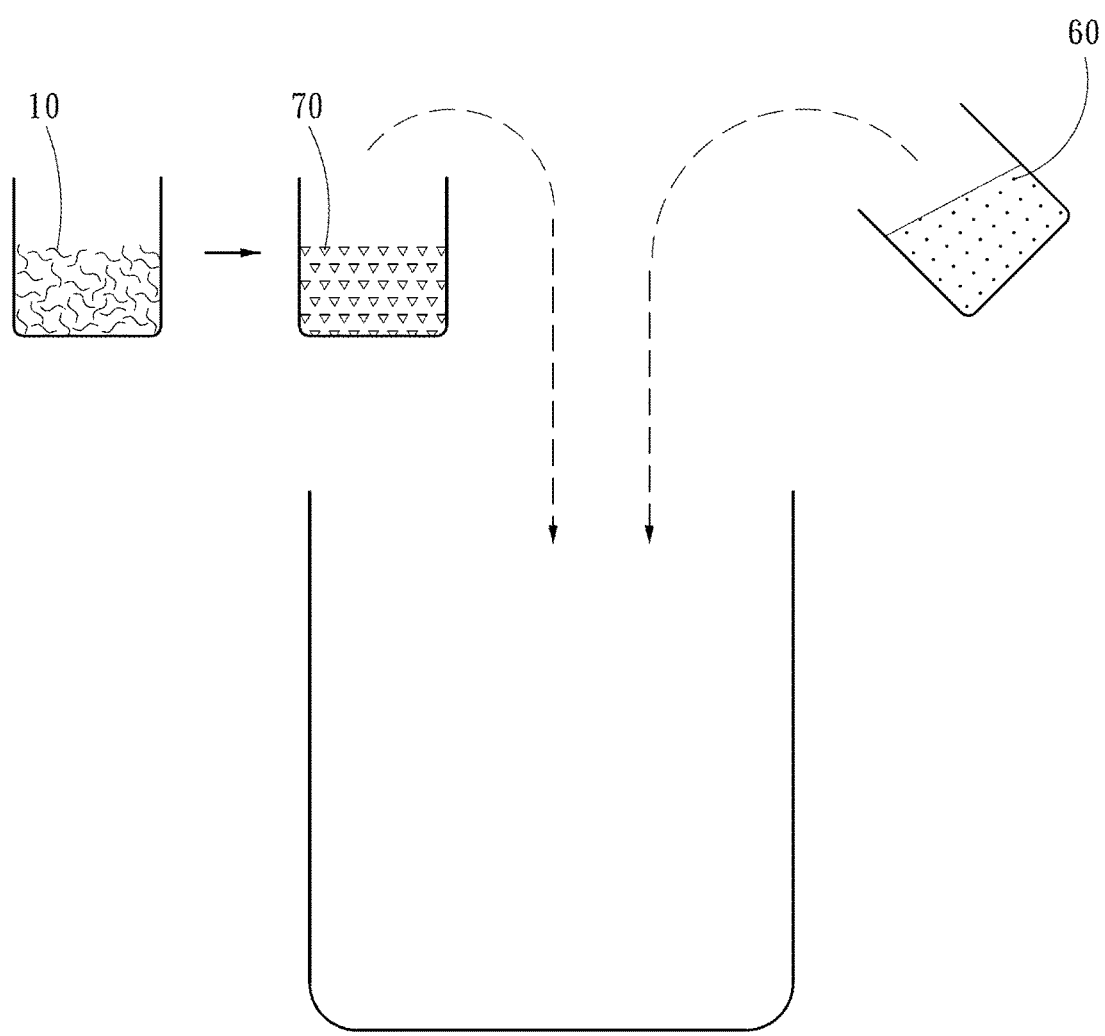
FIG. 3A is a first diagram schematically showing a method of fabricating a carbon material-containing dispersion according to another embodiment of the present invention.
Figure 3B:
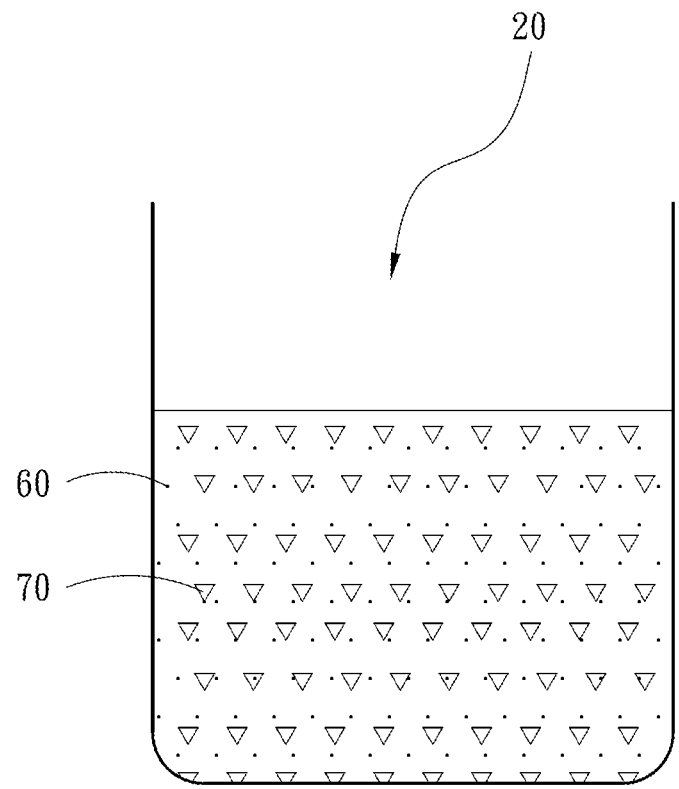
FIG. 3B is a second diagram schematically showing a method of fabricating a carbon material-containing dispersion according to another embodiment of the present invention.

Refer to FIG. 3A and FIG. 3B diagrams schematically showing a method of fabricating a carbon material-containing dispersion according to another embodiment of the present invention. In this embodiment, the carbon material-containing dispersion 20 is fabricated in a different method. The carbon material 10 is acidified to form an acidified carbon material 70 in an acidification process. The acidified carbon material 70 is mixed with the aqueous solvent 60 to form the carbon material-containing dispersion 20. In contrast to the abovementioned embodiment, the carbon material 10 can be dissolved in the aqueous solvent 60 without the surfactant 50 because the carbon material 10 has been acidified into the acidified carbon material 70 in the acidification process. The weight percentage of the carbon material 10 in the carbon material-containing dispersion 20 is 0.1 wt %-10 wt % preferably.

In conclusion, the present invention is characterized in using the high push force to push the carbon material-containing dispersion contacting the surface of the substrate so as to drive the carbon material of the carbon material-containing dispersion into the substrate and uniformly distribute the carbon material in the substrate. The present invention possesses utility, novelty and non-obviousness and meets the condition for a patent. Thus, the Inventors file the application for a patent. It is appreciated if the patent is approved fast.

The present invention has been fully demonstrated with the embodiments. However, these embodiments are only to exemplify the present invention but not to limit the scope of the present invention. Any equivalent modification or variation according to the spirit of the present invention is to be also included within the scope of the present invention.

What is claimed is:

1. A method of using high push force to fabricate a composite material containing carbon material, comprising steps of:
   preparing a carbon material-containing dispersion including a carbon material;
   placing a substrate in the carbon material-containing dispersion, and letting one surface of the substrate contact the carbon material-containing dispersion;
   using an explosive reaction generated by igniting a combustible material to create a chemical reaction to provide a high push force range between 300 G and 3000 G expanding the carbon material-containing dispersion outward from the center of the chemical reaction and pushing the carbon material to enter the substrate and to form a composite material containing the carbon material.

2. The method of using high push force to fabricate a composite material containing carbon material according to claim 1, wherein the carbon material-containing dispersion is fabricated via mixing the carbon material, a surfactant and an aqueous solvent to form the carbon material-containing dispersion.

3. The method of using high push force to fabricate a composite material containing carbon material according to claim 1, wherein the carbon material-containing dispersion is fabricated via acidifying the carbon material to form an acidified carbon material in an acidification process; and mixing the acidified carbon material with an aqueous solvent to form the carbon material-containing dispersion.

4. The method of using high push force to fabricate a composite material containing carbon material according to claim 1, wherein the carbon material is selected from a group consisting of carbon nanotubes, graphene, fullerene, and nanoribbons.

5. The method of using high push force to fabricate a composite material containing carbon material according to claim 2, wherein the surfactant is ammonium carboxymethyl cellulose or sodium carboxymethyl cellulose.

6. The method of using high push force to fabricate a composite material containing carbon material according to claim 1, wherein the substrate is made of a metallic material selected from a group consisting of aluminum, copper, titanium, tin, zinc and lead.

7. The method of using high push force to fabricate a composite material containing carbon material according to claim 1, wherein the substrate is made of polymeric material selected from a group consisting of polyethylene (PE), polystyrene (PS), polypropylene (PP), polycarbonate (PC), nylon, epoxy, silicone, and solvent-free plastic materials.

8. The method of using high push force to fabricate a composite material containing carbon material according to claim 1, wherein a weight percentage of the carbon material in the carbon material-containing dispersion is 0.1 wt %-10 wt %.

9. The method of using high push force to fabricate a composite material containing carbon material according to claim 3, wherein a weight percentage of the acidified carbon material in the carbon material-containing dispersion is 0.1 wt %-10 wt %.

10. The method of using high push force to fabricate a composite material containing carbon material according to claim 2, wherein a weight percentage of the surfactant in the carbon material-containing dispersion is 0.01 wt %-10 wt %.

* * * * *